US011979388B2

(12) United States Patent
Pollet et al.

(10) Patent No.: US 11,979,388 B2
(45) Date of Patent: May 7, 2024

(54) SYSTEM AND METHOD FOR ENHANCED DATA PROTECTION

(71) Applicant: Keyavi Data Corporation, Las Vegas, NV (US)

(72) Inventors: Cody Pollet, Austin, TX (US); Charles Burgess, Cedar Park, TX (US); Courtney Roach, Frisco, TX (US); Brandon Hart, Dallas, TX (US)

(73) Assignee: Keyavi Data Corporation, Las Vegas, NV (US)

( * ) Notice: Subject to any disclaimer, the term of this patent is extended or adjusted under 35 U.S.C. 154(b) by 550 days.

(21) Appl. No.: 17/025,838

(22) Filed: Sep. 18, 2020

(65) Prior Publication Data

US 2021/0058381 A1 Feb. 25, 2021

Related U.S. Application Data

(63) Continuation of application No. 16/670,245, filed on Oct. 31, 2019, now Pat. No. 10,812,456, which is a continuation of application No. 16/409,380, filed on May 10, 2019, now Pat. No. 10,498,704, which is a continuation of application No. 15/946,965, filed on Apr. 6, 2018, now Pat. No. 10,298,554, which is a (Continued)

(51) Int. Cl.
*H04L 9/40* (2022.01)

(52) U.S. Cl.
CPC ...... *H04L 63/0435* (2013.01); *H04L 63/0442* (2013.01); *H04L 63/08* (2013.01); *H04L 2463/062* (2013.01)

(58) Field of Classification Search
CPC . H04L 63/08; H04L 63/0442; H04L 63/0435; H04L 2463/062
USPC .......................................................... 726/1
See application file for complete search history.

(56) References Cited

U.S. PATENT DOCUMENTS

| 4,027,243 A | 5/1977 | Stackhouse et al. |
| 4,393,269 A | 7/1983 | Konheim et al. |
| 4,477,809 A | 10/1984 | Bose |

(Continued)

FOREIGN PATENT DOCUMENTS

| EP | 0501967 B1 | 9/1992 |
| EP | 0248403 B1 | 4/1994 |

(Continued)

OTHER PUBLICATIONS

Ford et al., "A Key Distribution Method for Object-Based Protection", ACM, Jan. 1, 1994 (5 pages).

(Continued)

*Primary Examiner* — Benjamin A Kaplan
(74) *Attorney, Agent, or Firm* — Ferguson Braswell Fraser Kubasta PC

(57) ABSTRACT

A method of an authentication server may include receiving, from a recipient computer system, recipient metadata comprising recipient information from the recipient computing system and a recipient network address. Access to the encrypted payload is authenticated by the recipient computer system using the recipient metadata. A response is sent to the recipient computer system after authenticating the recipient computer system. The recipient computer system decrypts the encrypted payload to access the payload in response to receiving the response.

12 Claims, 6 Drawing Sheets

Related U.S. Application Data continuation of application No. 15/136,142, filed on Apr. 22, 2016, now Pat. No. 9,954,832.

(60) Provisional application No. 62/152,178, filed on Apr. 24, 2015.

(56) References Cited

U.S. PATENT DOCUMENTS

| | | | |
|---|---|---|---|
| 4,484,355 A | 11/1984 | Henke et al. | |
| 4,530,051 A | 7/1985 | Johnson et al. | |
| 4,545,071 A | 10/1985 | Freeburg | |
| 4,707,592 A | 11/1987 | Ware | |
| 4,709,136 A | 11/1987 | Watanabe | |
| 4,799,156 A | 1/1989 | Shavit et al. | |
| 4,947,028 A | 8/1990 | Gorog | |
| 4,955,049 A | 9/1990 | Ghisler | |
| 5,020,093 A | 5/1991 | Pireh | |
| 5,053,606 A | 10/1991 | Kimizu | |
| 5,099,420 A | 3/1992 | Barlow et al. | |
| 5,220,564 A | 6/1993 | Tuch et al. | |
| 5,283,639 A | 2/1994 | Esch et al. | |
| 5,412,416 A | 5/1995 | Nemirofsky | |
| 5,426,427 A | 6/1995 | Chinnock et al. | |
| 5,475,819 A | 12/1995 | Miller et al. | |
| 5,483,596 A | 1/1996 | Rosenow et al. | |
| 5,577,120 A | 11/1996 | Penzias | |
| 5,600,364 A | 2/1997 | Hendricks et al. | |
| 5,604,542 A | 2/1997 | Dedrick | |
| 5,604,803 A | 2/1997 | Aziz | |
| 5,638,513 A | 6/1997 | Ananda | |
| 5,655,077 A | 8/1997 | Jones et al. | |
| 5,675,507 A | 10/1997 | Bobo, II | |
| 5,684,950 A | 11/1997 | Dare et al. | |
| 5,689,638 A | 11/1997 | Sadovsky | |
| 5,721,780 A | 2/1998 | Ensor et al. | |
| 5,802,304 A | 9/1998 | Stone | |
| 5,862,339 A | 1/1999 | Bonnaure et al. | |
| 5,884,024 A | 3/1999 | Lim et al. | |
| 5,889,958 A | 3/1999 | Willens | |
| 5,892,900 A | 4/1999 | Ginter et al. | |
| 5,896,444 A | 4/1999 | Perlman et al. | |
| 5,898,780 A | 4/1999 | Liu et al. | |
| 5,898,839 A | 4/1999 | Berteau | |
| 5,913,040 A | 6/1999 | Rakavy et al. | |
| 5,918,013 A | 6/1999 | Mighdoll et al. | |
| 5,935,207 A | 8/1999 | Logue et al. | |
| 5,940,074 A | 8/1999 | Britt, Jr. et al. | |
| 5,950,010 A | 9/1999 | Hesse et al. | |
| 5,974,461 A | 10/1999 | Goldman et al. | |
| 5,983,273 A | 11/1999 | White et al. | |
| 6,023,585 A | 2/2000 | Perlman et al. | |
| 6,023,698 A | 2/2000 | Lavey, Jr. et al. | |
| 6,026,079 A | 2/2000 | Perlman | |
| 6,061,798 A | 5/2000 | Coley et al. | |
| 6,070,192 A | 5/2000 | Holt et al. | |
| 6,073,168 A | 6/2000 | Mighdoll et al. | |
| 6,128,663 A | 10/2000 | Thomas | |
| 6,134,590 A | 10/2000 | Perlman | |
| 6,138,119 A | 10/2000 | Hall et al. | |
| 6,141,694 A | 10/2000 | Gardner | |
| 6,178,505 B1 | 1/2001 | Schneider et al. | |
| 6,185,685 B1 | 2/2001 | Morgan et al. | |
| 6,289,450 B1 | 9/2001 | Pensak et al. | |
| 6,311,197 B2 | 10/2001 | Mighdoll et al. | |
| 6,571,290 B2 | 5/2003 | Selgas et al. | |
| 6,721,784 B1 | 4/2004 | Leonard et al. | |
| 6,824,051 B2 | 11/2004 | Reddy et al. | |
| 6,990,684 B2 | 1/2006 | Futamura et al. | |
| 7,143,296 B2 | 11/2006 | Hirata | |
| 7,149,893 B1 | 12/2006 | Leonard et al. | |
| 7,290,285 B2 | 10/2007 | McCurdy et al. | |
| 7,310,821 B2 | 12/2007 | Lee et al. | |
| 7,353,385 B2 | 4/2008 | Nakano et al. | |
| 7,398,556 B2 | 7/2008 | Erickson | |
| 7,406,596 B2 | 7/2008 | Tararukhina et al. | |
| 7,418,737 B2 | 8/2008 | Grupe | |
| 7,472,280 B2 | 12/2008 | Giobbi | |
| 7,590,861 B2 | 9/2009 | Abdallah et al. | |
| 7,870,198 B2 | 1/2011 | Graham et al. | |
| 8,205,078 B2 | 6/2012 | Bhogal et al. | |
| 8,239,682 B2 | 8/2012 | Meehan et al. | |
| 8,290,160 B1 | 10/2012 | Steeger | |
| 8,474,058 B2 | 6/2013 | Benson et al. | |
| 8,677,126 B2 | 3/2014 | Meehan et al. | |
| 8,838,704 B2 | 9/2014 | Naylor et al. | |
| 9,003,548 B2 | 4/2015 | Pigin | |
| 9,094,215 B2 | 7/2015 | Meehan et al. | |
| 9,608,809 B1 * | 3/2017 | Ghetti | H04L 9/0822 |
| 2001/0029581 A1 | 10/2001 | Knauft | |
| 2002/0010679 A1 | 1/2002 | Felsher | |
| 2002/0027992 A1 | 3/2002 | Matsuyama et al. | |
| 2002/0048369 A1 | 4/2002 | Ginter et al. | |
| 2002/0082997 A1 | 6/2002 | Kobata et al. | |
| 2002/0091928 A1 | 7/2002 | Bouchard et al. | |
| 2002/0099941 A1 | 7/2002 | Tanimoto | |
| 2002/0129275 A1 | 9/2002 | Decuir | |
| 2003/0037237 A1 | 2/2003 | Abgrall et al. | |
| 2003/0044012 A1 | 3/2003 | Eden | |
| 2003/0191946 A1 | 10/2003 | Auer et al. | |
| 2004/0003139 A1 | 1/2004 | Cottrille et al. | |
| 2004/0003269 A1 | 1/2004 | Waxman et al. | |
| 2004/0022390 A1 | 2/2004 | McDonald et al. | |
| 2004/0148356 A1 | 7/2004 | Bishop et al. | |
| 2005/0060537 A1 | 3/2005 | Stamos et al. | |
| 2005/0120212 A1 | 6/2005 | Kanungo et al. | |
| 2005/0177873 A1 | 8/2005 | Wu et al. | |
| 2005/0229258 A1 | 10/2005 | Pigin | |
| 2006/0085850 A1 | 4/2006 | Mayfield et al. | |
| 2007/0033397 A1 | 2/2007 | Phillips, II et al. | |
| 2007/0050696 A1 | 3/2007 | Piersol et al. | |
| 2007/0067618 A1 | 3/2007 | Sandhu et al. | |
| 2007/0258585 A1 | 11/2007 | Sandhu et al. | |
| 2008/0294895 A1 | 11/2008 | Bodner et al. | |
| 2009/0154703 A1 | 6/2009 | Price et al. | |
| 2011/0082798 A1 | 4/2011 | Michaud et al. | |
| 2013/0073854 A1 | 3/2013 | Patti et al. | |
| 2013/0326220 A1 | 12/2013 | Connelly et al. | |
| 2015/0121063 A1 * | 4/2015 | Maller | H04L 63/0435 |
| | | | 713/153 |
| 2015/0244688 A1 | 8/2015 | Pigin | |
| 2016/0028700 A1 | 1/2016 | Meehan et al. | |
| 2016/0315918 A1 | 10/2016 | Pollet et al. | |
| 2018/0295108 A1 | 10/2018 | Pollet et al. | |

FOREIGN PATENT DOCUMENTS

| | | |
|---|---|---|
| EP | 0590861 A2 | 4/1994 |
| EP | 0421808 B1 | 12/1994 |
| EP | 0479660 B1 | 10/1996 |
| EP | 0745924 A2 | 12/1996 |
| EP | 0384339 B1 | 4/1997 |
| EP | 0506637 B1 | 8/2001 |
| EP | 0650307 B1 | 3/2004 |
| EP | 0814589 B1 | 8/2004 |
| GB | 2190820 A | 11/1987 |
| GB | 2289598 A | 11/1995 |
| WO | 8603926 A1 | 7/1986 |
| WO | 9317529 A1 | 9/1993 |
| WO | 9600485 A2 | 1/1996 |
| WO | 9707656 A2 | 3/1997 |
| WO | 9709682 A1 | 3/1997 |
| WO | 0197480 A2 | 12/2001 |

OTHER PUBLICATIONS

Bott et al., "Microsoft Windows Security Inside Out", Microsoft Press, Jan. 1, 2003 (14 pages).
Microsoft Computer Dictionary, Microsoft Press, 5th Edition, 2002 (3 pages).
Schneider, F .B., "Trust in Cyberspace", Committee on Information Systems Trustworthiness, Dec. 22, 1998 (249 pages).
"Authentica Unveils Saferoute for Secure Messaging", Press Release, Dec. 16, 2002 (2 pages).

(56) References Cited

OTHER PUBLICATIONS

International Search Report in related international application No. PCT/US16/28834, dated Aug. 30, 2016 (4 pages).

* cited by examiner

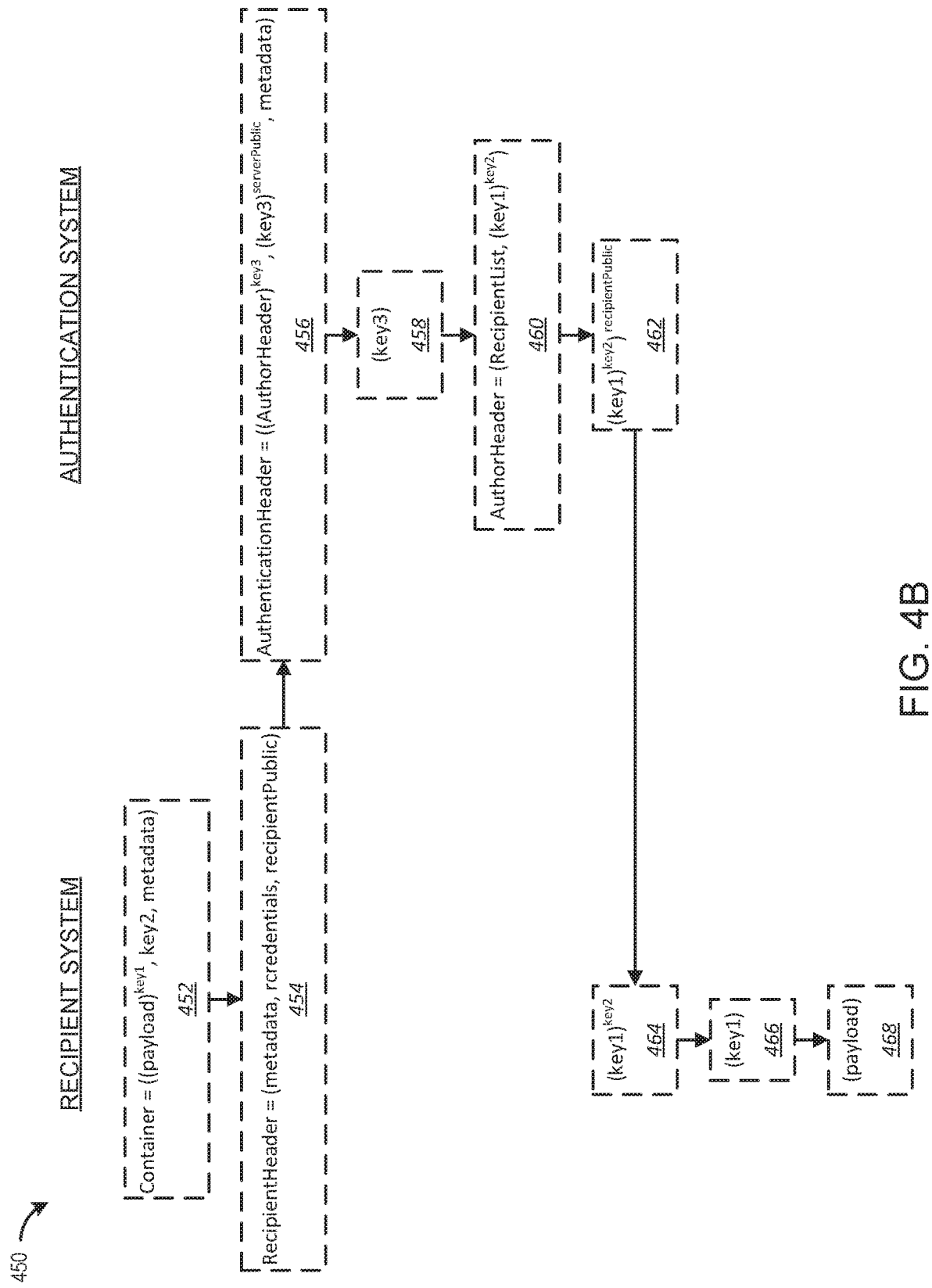

SYSTEM AND METHOD FOR ENHANCED DATA PROTECTION

CROSS-REFERENCE TO RELATED APPLICATIONS

This patent application is a continuation of U.S. patent application Ser. No. 16/670,245 filed on Oct. 31, 2019. U.S. patent application Ser. No. 16/670,245 is a continuation of U.S. patent application Ser. No. 16/409,380 filed on May 10, 2019. U.S. patent application Ser. No. 16/409,380 is a continuation of U.S. patent application Ser. No. 15/946,965 filed on Apr. 6, 2018. U.S. patent application Ser. No. 15/946,965 is a continuation of U.S. patent application Ser. No. 15/136,142 filed on Apr. 22, 2016. U.S. patent application Ser. No. 15/136,142 claims priority from U.S. Provisional Patent Application No. 62/152,178 filed on Apr. 24, 2015. U.S. patent application Ser. No. 16/670,245, U.S. patent application Ser. No. 16/409,380, U.S. patent application Ser. No. 15/946,965, U.S. patent application Ser. No. 15/136,142, and U.S. Provisional Patent Application No. 62/152,178 are hereby incorporated by reference.

BACKGROUND

Technical Field

The present disclosure relates generally to data security and more particularly, but not by way of limitation, to systems and methods for enhanced data protection.

History of Related Art

Asymmetric cryptography or public-key cryptography is cryptography in which a pair of keys is used to encrypt and decrypt data. Initially, a network user receives a public and private key pair from a certificate authority. Any other user who wants to send an encrypted message can get the intended recipient's public key from a public directory. They use this key to encrypt the message, and they send it to the recipient. When the recipient gets the message, they decrypt it with their private key. Asymmetric cryptography can be resource-intensive to implement. Symmetric cryptography is cryptography that uses the same key to encrypt and decrypt data. Symmetric-key systems are simpler and faster, but key exchange is difficult.

SUMMARY OF THE INVENTION

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

In general, in one aspect, one or more embodiments relate to a method of an authentication server. Recipient metadata comprising recipient information from the recipient computing system and a recipient network address is received from a recipient computer system. Access to the encrypted payload is authenticated by the recipient computer system using the recipient metadata. A response is sent to the recipient computer system after authenticating the recipient computer system. The recipient computer system decrypts the encrypted payload to access the payload in response to receiving the response.

In general, in one aspect, one or more embodiments relate to a system comprising a recipient computing system, an authentication server communicatively coupled to the recipient computing system, and a sender computing system communicatively coupled to the authentication server. The sender computing system includes a sender application configured for encrypting, by the sender computer system, a payload with a symmetric key to generate an encrypted payload; sending, from the sender computer system to a recipient computer system, the encrypted payload; and sending, from the recipient computer system to the authentication server, recipient metadata comprising recipient information from the recipient computing system and a recipient network address. The authentication server includes a server application configured for authenticating access, by the recipient computer system, to the encrypted payload, wherein authenticating access uses the recipient metadata; and sending, from the authentication server to the recipient computer system, a response after authenticating the recipient computer system. The recipient computing system includes a recipient application configured for decrypting, by the recipient computer system, the encrypted payload to access the payload in response to receiving the response.

In general, in one aspect, one or more embodiments relate to a non-transitory computer-readable storage medium storing instructions configured to execute on a processor, the instructions including functionality to perform receiving, from a recipient computer system, recipient metadata comprising recipient information from the recipient computing system and a recipient network address. Access to the encrypted payload is authenticated by the recipient computer system using the recipient metadata. A response is sent to the recipient computer system after authenticating the recipient computer system. The recipient computer system decrypts the encrypted payload to access the payload in response to receiving the response.

BRIEF DESCRIPTION OF THE DRAWINGS

A more complete understanding of the method and apparatus of the present invention may be obtained by reference to the following Detailed Description when taken in conjunction with the accompanying Drawings wherein:

FIG. 4B illustrates example data that can be used or generated as part of a process for accessing a protected data transmission.

DETAILED DESCRIPTION

The present disclosure describes examples of securing network transmissions in a way that can minimize or eliminate a risk that data is compromised as a result of a single point of failure. In certain embodiments, a payload can be separated from a key used to encrypt it. Furthermore, in certain embodiments, a trusted authentication server can facilitate secure transmission and access to the payload without itself having access either to the payload or a key used to encrypt the payload. For purposes of this patent application, the term payload can refer to the part of transmitted data, such as actual or body data, that is the primary purpose of the transmission.

Figure 1:
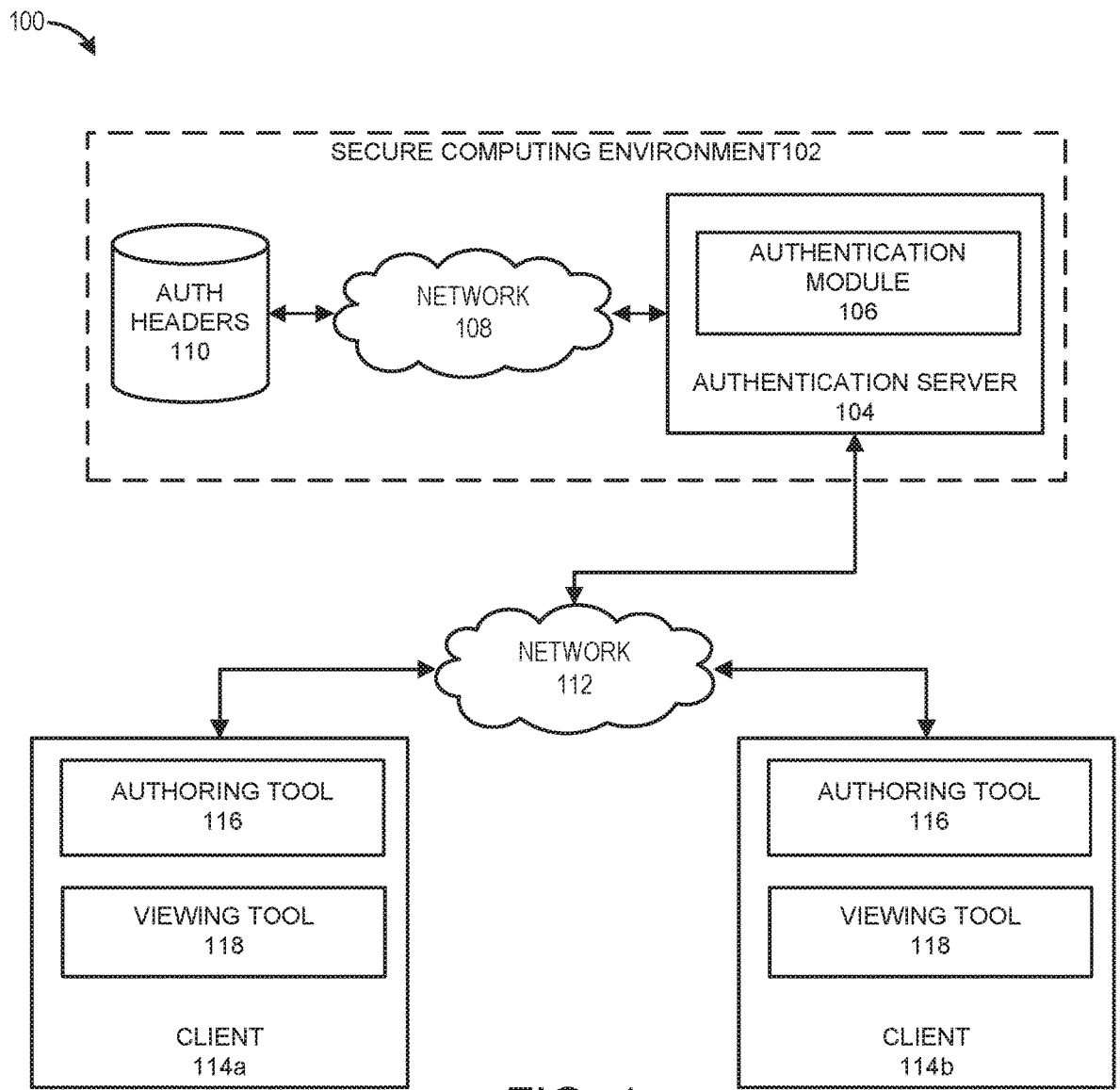
FIG. 1 illustrates an example of a system for providing enhanced data protection.

FIG. 1 illustrates an example of a system 100 for providing enhanced data protection. The system 100 includes a secure computing environment 102, a client 114a and a client 114b, each of which is operable to communicate over a network 112. The network 112 may be a private network, a public network, a local or wide area network, a portion of the Internet combinations of the same, and/or the like.

The secure computing environment 102 can include an authentication server 104 and a data store 110, each of which is operable to communicate over a network 108. The authentication server 104 includes an authentication module 106 that, in certain embodiments, can mediate protected network transmissions (e.g., network transmissions that include encrypted data) from senders to recipients. The data store 110 can store authentication headers that, in a typical embodiment, are generated by sender computer systems for each individual protected network transmission. A given authentication header, for a given network transmission, can include, for example, a list of one or more authorized recipients, metadata sufficient to identify or distinguish the authentication header from other authentication headers, encryption keys, and/or other information. Examples of how an authentication header can be generated, structured and used will be described in relation to the ensuing FIGURES.

In some embodiments, the data store 110 can be in a separate physical and/or geographic location from the authentication server 104. In these embodiments, physical and/or geographic isolation can in some cases improve data security. Further, in some embodiments, the data store 110 can be restricted such that access is only permitted by the authentication server 104. In other embodiments, the data store 110 can be co-located with, and/or resident on, the authentication server 104. In some embodiments, the network 108 can represent any manner of communication between the authentication server 104 and the data store 110 such as, for example, a private network, a direct connection between the authentication server 104 and the data store 110, etc. By way of further example, in some cases, the network 108 can be or include a local or wide area network, a portion of the Internet, combinations of same and/or the like. It should be appreciated that, although the authentication server 104 and the data store 110 are illustrated singly, each component can be illustrative of a plurality of such components. For example, in some embodiments, the data store 110 can be representative of a plurality of data stores and the authentication server 104 can be representative of a cluster of authentication servers.

The clients 114 are each shown to include an authoring tool 116 and a viewing tool 118. The authoring tool 116 can include software and/or hardware that sends protected network transmissions (e.g., network transmissions that include encrypted data) to one or more recipient computer systems. The viewing tool 118 can include software and/or hardware that receives and decrypts protected network transmissions received from sender computer systems. It should be appreciated that the clients 114 can be considered either sender or recipient computer systems depending on context. For purposes of clarity, a client executing the authoring tool 116 to send a protected network transmission may be referred to as a sender computer system with respect to the sent transmission. Similarly, a client executing the viewing tool 118 to receive and access a protected network transmission may be referred to as a recipient computer system with respect to the received transmission.

In operation, the authoring tool 116, the viewing tool 118 and the authentication module 106 can collaborate to execute a multi-node encryption/decryption protocol for protected network transmissions. In general, particular combinations of symmetric and asymmetric keys can be used to progressively encrypt data in a multi-layered fashion so as to reduce or eliminate points of failure. Examples of functionality for initiating and sending protected network transmissions will be described in relation to FIGS. 3A-B. Examples of functionality for receiving and accessing protected network transmissions will be described in relation to FIGS. 4A-B. Other examples of systems that can implement processes described herein are detailed in U.S. Pat. No. 8,239,682. U.S. Pat. No. 8,239,682 is hereby incorporated by reference.

Figure 2:
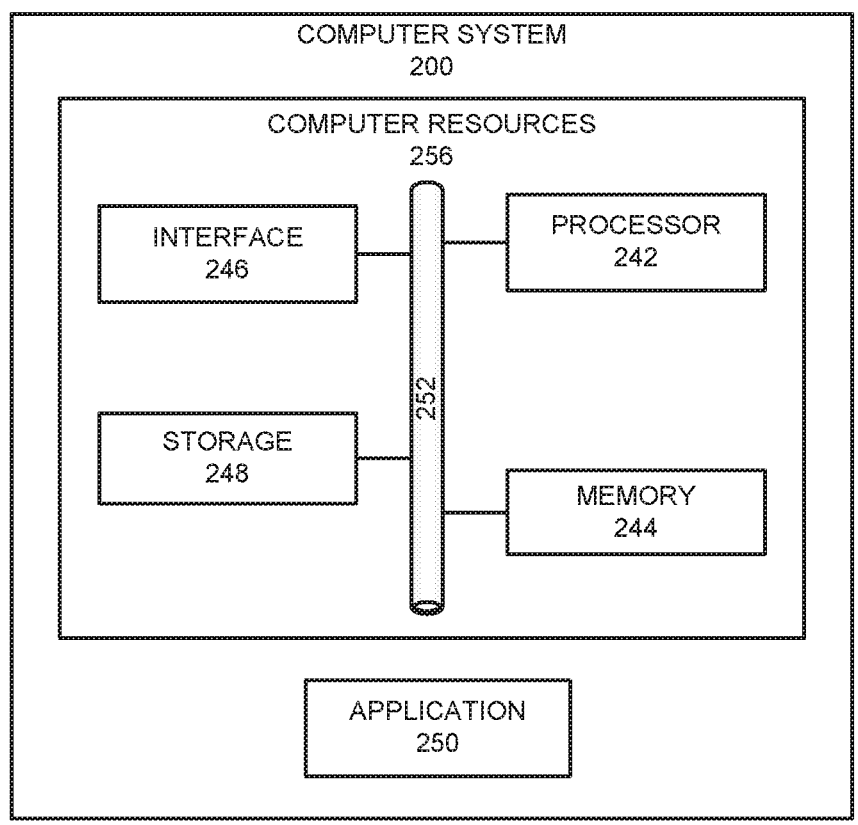
FIG. 2 illustrates an example of a computer system.

FIG. 2 illustrates an example of a computer system 200 that, in some cases, can be representative, for example, of the authentication server 104, the data store 110 and/or the clients 114. The computer system 200 includes an application 250 operable to execute on computer resources 256. The application 250 can be similar, for example, to the authentication module 106, the authoring tool 116 and/or the viewing tool 118. In particular embodiments, the computer system 200 may perform one or more steps of one or more methods described or illustrated herein. In particular embodiments, one or more computer systems may provide functionality described or illustrated herein. In particular embodiments, encoded software running on one or more computer systems may perform one or more steps of one or more methods described or illustrated herein or provide functionality described or illustrated herein.

The components of the computer system 200 may comprise any suitable physical form, configuration, number, type and/or layout. As an example, and not by way of limitation, the computer system 200 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the computer system 200 may include one or more computer systems; be unitary or distributed; span multiple locations; span multiple machines; or reside in a cloud, which may include one or more cloud components in one or more networks.

In the depicted embodiment, the computer system 200 includes a processor 242, memory 244, storage 248, interface 246, and bus 252. Although a particular computer system is depicted having a particular number of particular components in a particular arrangement, this disclosure contemplates any suitable computer system having any suitable number of any suitable components in any suitable arrangement.

Processor 242 may be a microprocessor, controller, or any other suitable computing device, resource, or combination of hardware, software and/or encoded logic operable to execute, either alone or in conjunction with other components, (e.g., memory 244), the application 250. Such functionality may include providing various features discussed herein. In particular embodiments, processor 242 may include hardware for executing instructions, such as those making up the application 250. As an example and not by way of limitation, to execute instructions, processor 242 may retrieve (or fetch) instructions from an internal register, an internal cache, memory 244, or storage 248; decode and execute them; and then write one or more results to an internal register, an internal cache, memory 244, or storage 248.

In particular embodiments, processor 242 may include one or more internal caches for data, instructions, or addresses. This disclosure contemplates processor 242 including any suitable number of any suitable internal caches, where appropriate. As an example and not by way of limitation, processor 242 may include one or more instruction caches, one or more data caches, and one or more translation lookaside buffers (TLBs). Instructions in the instruction caches may be copies of instructions in memory 244 or storage 248 and the instruction caches may speed up retrieval of those instructions by processor 242. Data in the data caches may be copies of data in memory 244 or storage 248 for instructions executing al processor 242 to operate on; the results of previous instructions executed at processor 242 for access by subsequent instructions executing at processor 242, or for writing to memory 244, or storage 248; or other suitable data. The data caches may speed up read or write operations by processor 242. The TLBs may speed up virtual-address translations for processor 242. In particular embodiments, processor 242 may include one or more internal registers for data, instructions, or addresses. Depending on the embodiment, processor 242 may include any suitable number of any suitable internal registers, where appropriate. Where appropriate, processor 242 may include one or more arithmetic logic units (ALUs); be a multi-core processor; include one or more processors 242; or any other suitable processor.

Memory 244 may be any form of volatile or non-volatile memory including, without limitation, magnetic media, optical media, random access memory (RAM), read-only memory (ROM), flash memory, removable media, or any other suitable local or remote memory component or components. In particular embodiments, memory 244 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 244 may include one or more memories 244, where appropriate. Memory 244 may store any suitable data or information utilized by the computer system 200, including software embedded in a computer readable medium, and/or encoded logic incorporated in hardware or otherwise stored (e.g., firmware). In particular embodiments, memory 244 may include main memory for storing instructions for processor 242 to execute or data for processor 242 to operate on. In particular embodiments, one or more memory management units (MMUs) may reside between processor 242 and memory 244 and facilitate accesses to memory 244 requested by processor 242.

As an example and not by way of limitation, the computer system 200 may load instructions from storage 248 or another source (such as, for example, another computer system) to memory 244. Processor 242 may then load the instructions from memory 244 to an internal register or internal cache. To execute the instructions, processor 242 may retrieve the instructions from the internal register or internal cache and decode them. During or after execution of the instructions, processor 242 may write one or more results (which may be intermediate or final results) to the internal register or internal cache. Processor 242 may then write one or more of those results to memory 244. In particular embodiments, processor 242 may execute only instructions in one or more internal registers or internal caches or in memory 244 (as opposed to storage 248 or elsewhere) and may operate only on data in one or more internal registers or internal caches or in memory 244 (as opposed to storage 248 or elsewhere).

In particular embodiments, storage 248 may include mass storage for data or instructions. As an example and not by way of limitation, storage 248 may include a hard disk drive (HDD), a floppy disk drive, flash memory, an optical disc, a magneto-optical disc, magnetic tape, or a Universal Serial Bus (USB) drive or a combination of two or more of these. Storage 248 may include removable or non-removable (or fixed) media, where appropriate. Storage 248 may be internal or external to the computer system 200, where appropriate. In particular embodiments, storage 248 may be non-volatile, solid-state memory. In particular embodiments, storage 248 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 248 may take any suitable physical form and may comprise any suitable number or type of storage. Storage 248 may include one or more storage control units facilitating communication between processor 242 and storage 248, where appropriate.

In particular embodiments, interface 246 may include hardware, encoded software, or both providing one or more interfaces for communication (such as, for example, packet-based communication) among any networks, any network devices, and/or any other computer systems. As an example and not by way of limitation, communication interface 246 may include a network interface controller (NIC) or network adapter for communicating with an Ethernet or other wire-based network and/or a wireless NIC (WNIC) or wireless adapter for communicating with a wireless network.

Depending on the embodiment, interface 246 may be any type of interface suitable for any type of network for which computer system 200 is used. As an example and not by way of limitation, computer system 200 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 200 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The computer system 200 may include any suitable interface 246 for any one or more of these networks, where appropriate.

In some embodiments, interface 246 may include one or more interfaces for one or more I/O devices. One or more of these I/O devices may enable communication between a person and the computer system 200. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 246 for them. Where appropriate, interface 246 may include one or more drivers enabling processor 242 to drive one or more of these I/O devices. Interface 246 may include one or more interfaces 246, where appropriate.

Bus 252 may include any combination of hardware, software embedded in a computer readable medium, and/or encoded logic incorporated in hardware or otherwise stored (e.g., firmware) to couple components of the computer system 200 to each other. As an example and not by way of limitation, bus 252 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. Bus 252 may include any number, type, and/or configuration of buses 252, where appropriate. In particular embodiments, one or more buses 252 (which may each include an address bus and a data bus) may couple processor 242 to memory 244. Bus 252 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 242 (such as, for example, one or more internal registers or caches), one or more portions of memory 244, one or more portions of storage 248, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C, Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

Figure 3A:
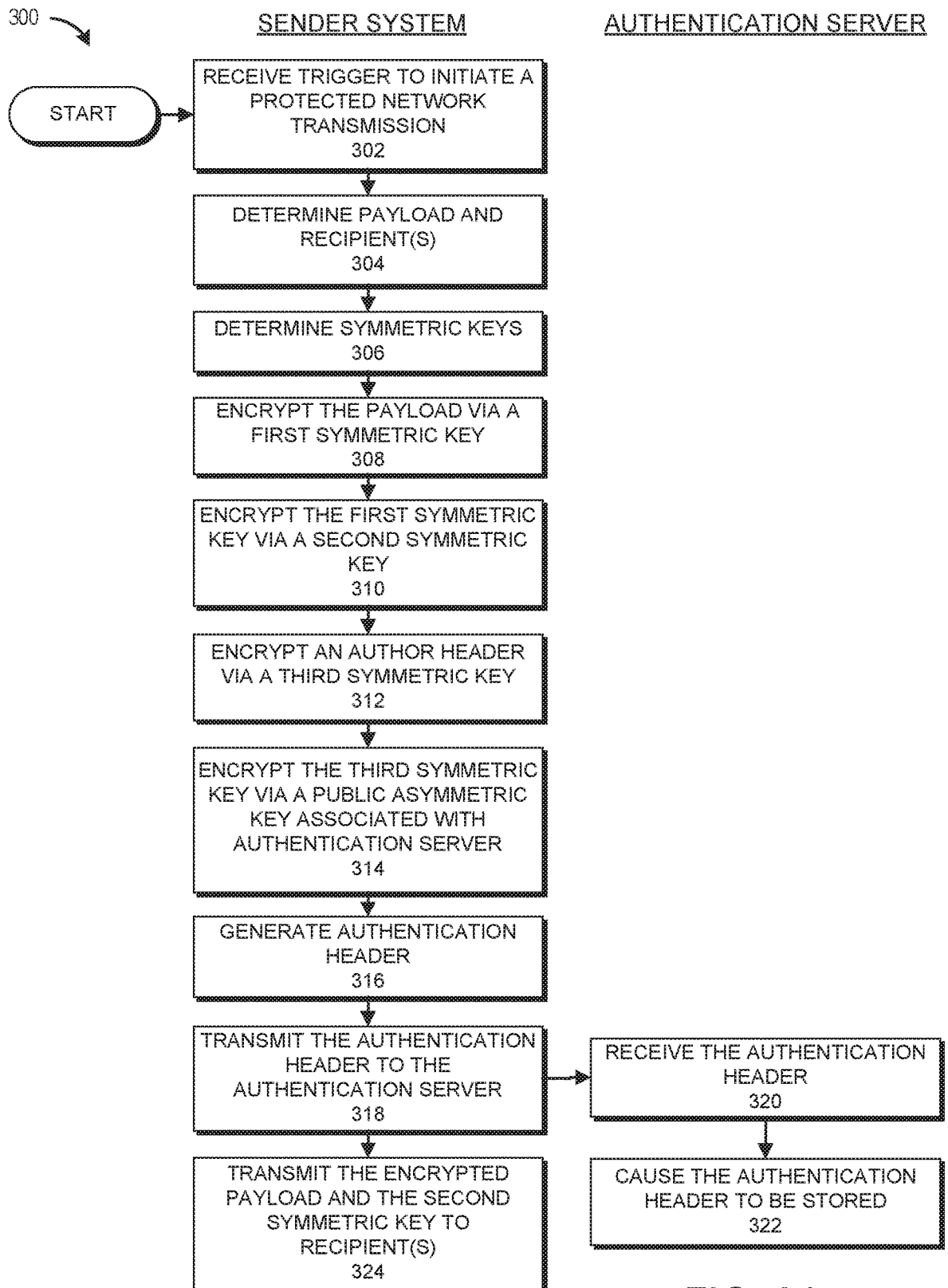
FIG. 3A illustrates an example of a process for initiating and sending a protected data transmission.
Figure 3B:
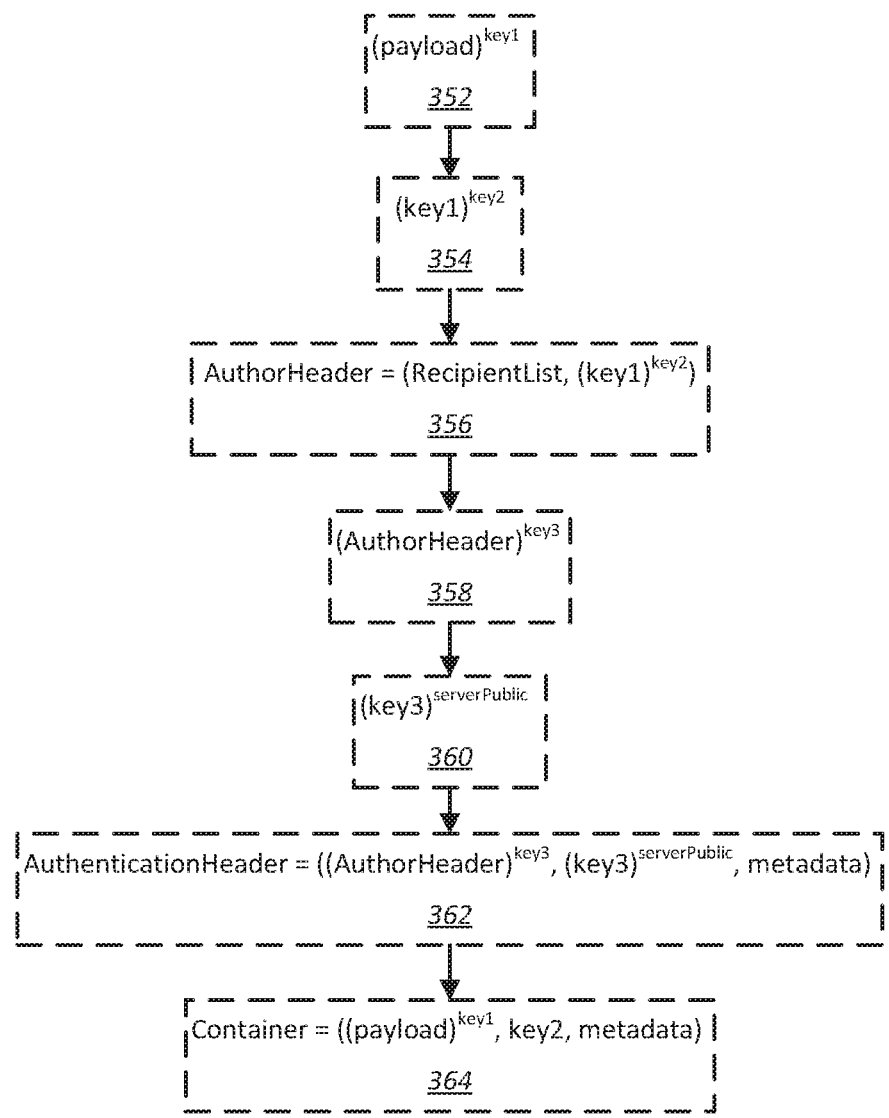
FIG. 3B illustrates example data that can be used or generated as part of a process for initiating and sending a protected data transmission.

FIG. 3A illustrates an example of a process 300 for initiating and sending a protected data transmission by a sender computer system such as, for example, one of the clients 114 of FIG. 1. FIG. 3B describes example data 350 that can be used or generated as part of the process 300. In general, the process 300, in whole or in part, can be implemented by one or more of the authentication server 104, the authentication module 106, the data store 110, the clients 114, the authoring tool 116 and/or the viewing tool 118. The process 300 can also be performed generally by the secure computing environment 102 and/or the system 100. Although any number of systems, in whole or in part, can implement the process 300, to simplify discussion, the process 300 will be described in relation to specific systems or subsystems of the system 100.

At block 302, the authoring tool 116 receives a trigger to initiate a protected network transmission. In some cases, the trigger can be received from a user interface of the authoring tool 116. For example, the authoring tool 116 can receive a user indication or specification of a desire to initiate the protected network transmission. In other cases, the trigger can be on a scheduled or periodic basis, received from a system or entity in communication with the authoring tool 116, combinations of same and/or the like.

At block 304, the authoring tool 116 determines a payload of the protected network transmission and one or more recipients to whom the protected network transmission should be sent. In an example, the payload and/or the recipient(s) can be user-specified via a user interface of the authoring tool 116. In another embodiment, the payload and/or recipient(s) can be automatically generated based on rules or logic contained by, or accessible to, the authoring tool 116. In an example, suppose the authoring tool 116 were to be used to support an online banking service that requires periodic auditing by particular authorized users. According to this example, the authoring tool 116 could generate, as the payload, a compilation of personal information used for the auditing. Moreover, continuing the example, the authoring tool 116 could automatically determine the recipient(s), for example, based on a predetermined workflow, information or conditions present in the generated payload, combinations of same and/or the like.

At block 306, the authoring tool determines symmetric keys that will be used for the protected network transmission. In certain embodiments, the symmetric keys can be generated as part of the block 306 using, for example, the American Encryption Standard (AES) algorithm. It should be appreciated that the symmetric keys are described in the aggregate only for simplicity of description. In some embodiments, each symmetric key can be individually determined or generated on-demand at a time when encryption using that symmetric key is to occur (or just prior to such a time). In other embodiments, the symmetric keys can be determined together, or substantially contemporaneously. For purposes of illustration, examples will be described herein in which three symmetric keys are determined at the block 306. In particular, reference will be made herein to first, second and third symmetric keys. It should be appreciated that ordinal numbers are used to describe the symmetric keys for consistency of reference. These ordinal numbers do not necessarily imply an order of determination, generation and/or use. Furthermore, in various embodiments, different combinations of symmetric and/or asymmetric keys can be utilized.

At block 308, the authoring tool 116 encrypts the payload using a first symmetric key of the symmetric keys. In an example, the block 308 can yield data item 352 of FIG. 3B. At block 310, the authoring tool 116 encrypts the first symmetric key via a second symmetric key of the symmetric keys. In an example, the block 312 can yield data item 354 of FIG. 3B.

At block 312, the authoring tool 116 encrypts an author header via a third symmetric key. The author header can include, for example, a list of the one or more authorized recipients, the encrypted first symmetric key, and/or other information. In some embodiments, the block 312 can include generating the author header. In an example, the author header can correspond to a format of data item 356 of FIG. 3B. As a result of encryption via the third symmetric key, the block 312 can yield, for example, data item 358 of FIG. 3B.

At block 314, the authoring tool 116 encrypts the third symmetric key via a public asymmetric key associated with the authentication server 104 and/or the authentication module 106. In various embodiments, the public asymmetric key can correspond to the public key of a public-private key pair from a certificate authority. According to this example, the corresponding private asymmetric key can be considered to be in the possession of the authentication server 104. In an example, the block 314 can yield data item 360 of FIG. 3B.

At block 316, the authoring tool 116 generates an authentication header. The authentication header can include, for example, the encrypted author header, the encrypted third symmetric key, metadata and/or other information. In an example, the block 316 can yield data item 362 of FIG. 3B. In some embodiments, the generation of the authentication header can be omitted in favor of handling the elements of the authentication header as separate data items. For purposes of these embodiments, the operations described herein in relation to authentication headers can be replaced with operations in relation to the constituent parts of the authentication headers.

In certain embodiments, the metadata included in the authentication header can include information sufficient to identify or distinguish the authentication header from other authentication headers (or, alternatively, identify or distinguish the protected data transmission from other protected data transmissions mediated by the authentication server 104). In an example, the metadata can include information about the protected data transmission such as, for example, temporal data about the protected data transmission (e.g., a timestamp associated with the trigger, a current timestamp as of metadata generation, etc.), information about the sender computer system, information about the recipient computer system, etc. The information about the sender computer system can include, for example, a username, handle and/or address (e.g., email address) of a user who initiated or is responsible for the transmission, a network address and/or hardware fingerprint of the sender computer system, combinations of same and/or the like. Similarly, the information about the recipient computer system can include, for example, a username, handle and/or address (e.g., email address) of each user who is authorized to receive or access the protected data transmission, a network address and/or hardware fingerprint of the recipient computer system, a random or unique identifier associated with the protected data transmission, combinations of same and/ or the like. In certain embodiments, the block 316 can include generating the metadata.

At block 318, the authoring tool 116 transmits the authentication header to the authentication server 104 for use in recipient-initiated pre-access authentication of the one or more recipients. At block 320, the authentication module 106 of the authentication server 104 receives the authentication header. At block 322, the authentication module 106 causes the authentication header to be stored in the data store 110 for later retrieval during recipient-initiated pre-access authentication.

At block 324, the authoring tool 116 transmits the encrypted payload and the second symmetric key to the determined recipients. In general, the transmission can occur via any network or messaging protocol. In some embodiments, the encrypted payload and the second symmetric key can be encapsulated in a container of a preconfigured file format. In these embodiments, the block 324 can include generating a container that includes the encrypted payload and the second symmetric key and transmitting the container to the determined recipients. For example, in various embodiments, the container can be transmitted via social-media messaging, instant messaging, email, file sharing, etc. Furthermore, in some cases, the act of transmitting can refer to making the container, or the data items thereof, available for download over a network. An example of a container is shown with respect to data item 364 of FIG. 3B.

Figure 4A:
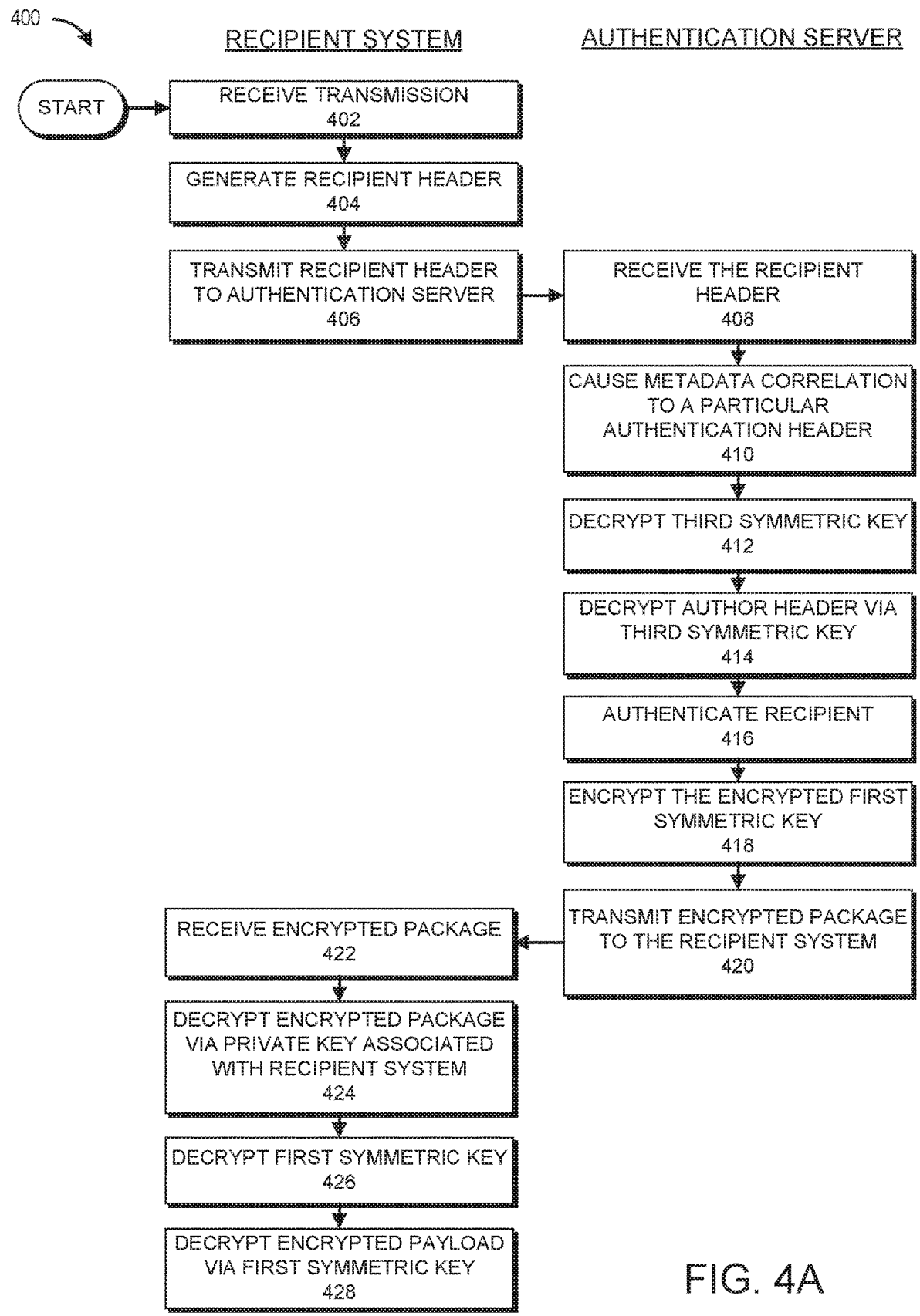
FIG. 4A illustrates an example of a process for accessing a protected data transmission.

FIG. 4A illustrates an example of a process 400 for accessing a protected data transmission by a recipient computer system such as, for example, one of the clients 114 of FIG. 1. FIG. 4B describes example data 450 that can be used or generated as part of the process 400. In general, the process 400, in whole or in part, can be implemented by one or more of the authentication server 104, the authentication module 106, the data store 110, the clients 114, the authoring tool 116 and/or the viewing tool 118. The process 400 can also be performed generally by the secure computing environment 102 and/or the system 100. Although any number of systems, in whole or in part can implement the process 400, to simplify discussion, the process 400 will be described in relation to specific systems or subsystems of the system 100.

At block 402, the viewing tool 118 of the recipient computer system receives a protected data transmission. In a typical embodiment, the protected data transmission has been sent to the recipient computer system as described in relation to FIGS. 3A-B. In some cases, the protected data transmission can be, include or be contained within a container of the format shown with respect to data item 452 of FIG. 4B.

At block 404, the viewing tool 118 generates a recipient header. The recipient header can include metadata, recipient authentication information (e.g., recipient credentials associated with the recipient computer system or a user of the recipient computer system), a public key associated with the recipient computer system, and/or other information. In some cases, the metadata of the recipient header can correspond to, or include selected parts of, the metadata of the received protected data transmission (e.g., see the data item 452). Generally, the metadata of the recipient header includes information sufficient to identify an authentication header corresponding to the protected data transmission. In an example, the block 404 can yield data item 454 of FIG. 4B. At block 406, the viewing tool 118 transmits the recipient header to the authentication server 104 so as to initiate pre-access authentication.

At block 408, the authentication module 106 of the authentication server 104 receives the recipient header. At block 410, the authentication module 106 uses the metadata of the recipient header to correlate the recipient header to a particular authentication header of the data store 110 that relates to the same protected data transmission. In a typical embodiment, the recipient header includes metadata of the same type and format (or of a similar type and format) as the metadata of the authentication headers of the data store 110. Thus, in certain embodiments, the correlation can involve matching the metadata of the recipient header to the metadata of the authentication headers of the data store 110 so as to yield the particular authentication header. In some embodiments, the data store 110 can receive the metadata, perform the correlation and return the particular authentication header to the authentication module 106. In other embodiments, the correlation can be performed, at least in part, by the authentication module 106. In an example, the particular authentication header to which the recipient header is correlated can be of the form shown in relation to data item 456 of FIG. 4B.

At block 412, the authentication module 106 decrypts the third symmetric key from the particular authentication header via a private key associated with the authentication server 104. In example, the block 412 can yield data item 458 of FIG. 413. At block 414, the authentication module 106 decrypts the author header from the particular authentication header via the decrypted third symmetric key. In example, the block 414 can yield data item 460 of FIG. 4B.

At block 416, the authentication module 106 authenticates the recipient computer system (or a user thereof) as an authorized recipient of the encrypted payload to which the particular authentication header corresponds. For example, authentication can be based on a determined match between a portion of the recipient authentication information and the authorized recipient list of the decrypted author header. According to this example, the appearance of a recipient user name in both the recipient authentication information and the authorized recipient list could result in a determination that the recipient computer system is an authorized recipient (provided that any other applicable security criteria, such as password authentication, is satisfied). In some embodiments, if the authentication at block 416 is not successful, such that the recipient computer system is not authenticated as an authorized recipient, the process 400 terminates.

At block 418, the authentication module 106 encrypts the encrypted first symmetric key using the public asymmetric key associated with the recipient computer system. The block 418 can yield an encrypted package, or a doubly-encrypted first asymmetric key, for example, of the form of data item 462 of FIG. 4B. At block 420, the authentication module 106 transmits the encrypted package to the recipient computer system.

At block 422, the viewing tool 118 receives the encrypted package. At block 424, the viewing tool 118 decrypts the encrypted package via a private key associated with the recipient computer system. In an example, the block 424 can yield data item 464 of FIG. 4B. At block 426, the viewing tool 118 decrypts the first symmetric key via the second symmetric key, which key was included in the protected data transmission received at block 402. In an example, the block 426 can yield data item 466 of FIG. 4B. At block 428, the viewing tool 118 decrypts the encrypted payload of the protected data transmission via the first symmetric key. In an example, the block 428 can yield data item 468 of FIG. 4B.

Advantageously, in certain embodiments, the processes described in relation to FIGS. 3A-B and 4A-B can separate the payload of a protected data transmission from a key used to encrypt it for improved data security. As described above, the payload of the protected data transmission can be encrypted via a symmetric key referred to as a first symmetric key and sent lo a recipient computer system. In certain embodiments, the authentication server 104 can mediate an encryption/decryption protocol between a sender computer system and a recipient computer system without being provided access to either the payload or an unencrypted or decryptable form of the first symmetric key. Rather, as described above, the first symmetric key can be encrypted via a symmetric key referred to as a second symmetric key and provided, in that encrypted form, to the authentication server 104 as part of an authentication header. In a typical embodiment, the recipient computer system is able to decrypt the payload after authentication, at which point the encrypted first symmetric key is received from the authentication server 104. The ability to decrypt is due, in part, to the fact that the protected data transmission includes the second symmetric key. However, in a typical embodiment, the authentication server 104 does not receive either the second symmetric key or the payload. Thus, in various embodiments described herein, a total compromise of the authentication server 104 and/or the data store 110 would not result in exposure of protected data at least because the authentication server 104 lacks a key used to protect the payload.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising, by an authentication server:
receiving, from a recipient computer system, recipient metadata comprising recipient information from the recipient computing system and a recipient network address, wherein the recipient computing system comprises a container comprising a payload and container metadata, wherein the payload is an encrypted payload in the container;
authenticating access, by the recipient computer system, to the encrypted payload, wherein authenticating access uses the recipient metadata; and
sending, to the recipient computer system, a response after authenticating the recipient computer system, wherein the recipient computer system decrypts the encrypted payload from the container to access the payload in response to receiving the response.

2. The method of claim 1, further comprising:
receiving, from a sender computer system, sender metadata comprising sender information from the sender computing system, wherein the sender information comprises a sender hardware fingerprint of the sender computer system.

3. The method of claim 1, wherein the recipient information comprises a recipient hardware fingerprint of the recipient computer system.

4. The method of claim 1, wherein the container metadata comprises at least one of a recipient hardware fingerprint and authorized access information.

5. A system comprising:
a recipient computing system;
an authentication server communicatively coupled to the recipient computing system; and
a sender computing system communicatively coupled to the authentication server and comprising a sender application configured for:
encrypting, by the sender computer system, a payload with a symmetric key to generate an encrypted payload;
sending, from the sender computer system to a recipient computer system, the encrypted payload; and
wherein the recipient computing system comprises a recipient application configured for:
sending, from the recipient computer system to the authentication server, recipient metadata comprising recipient information from the recipient computing system and a recipient network address, wherein the recipient computing system comprises a container comprising a payload and container metadata, wherein the payload is an encrypted payload in the container,
wherein the authentication server comprises a server application configured for:
authenticating access, by the recipient computer system, to the encrypted payload, wherein authenticating access uses the recipient metadata; and
sending, from the authentication server to the recipient computer system, a response after authenticating the recipient computer system; and
wherein the recipient computing system comprises the recipient application further configured for:
decrypting, by the recipient computer system, the encrypted payload from the container to access the payload in response to receiving the response.

6. The system of claim 5, wherein the sender application is further configured for:
sending, from a sender computer system to an authentication server, sender metadata comprising sender information from the sender computing system, wherein the sender information comprises a sender hardware fingerprint of the sender computer system.

7. The system of claim 5, wherein the recipient information comprises a recipient hardware fingerprint of the recipient computer system.

8. The system of claim 5, wherein the container metadata comprises at least one of a recipient hardware fingerprint and authorized access information.

9. A non-transitory computer-readable storage medium storing instructions configured to execute on a processor, the instructions comprising functionality to perform:
receiving, from a recipient computer system, recipient metadata comprising recipient information from the recipient computing system and a recipient network address, wherein the recipient computing system comprises a container comprising a payload and container metadata, wherein the payload is an encrypted payload in the container;
authenticating access, by the recipient computer system, to the encrypted payload, wherein authenticating access uses the recipient metadata; and
sending, to the recipient computer system, a response after authenticating the recipient computer system, wherein the recipient computer system decrypts the encrypted payload from the container to access the payload in response to receiving the response.

10. The non-transitory computer-readable storage medium of claim 9, further comprising:
receiving, from a sender computer system, sender metadata comprising sender information from the sender computing system, wherein the sender information comprises a sender hardware fingerprint of the sender computer system.

11. The non-transitory computer-readable storage medium of claim 9, wherein the recipient information comprises a recipient hardware fingerprint of the recipient computer system.

12. The non-transitory computer-readable storage medium of claim 9, wherein the container metadata comprises at least one of a recipient hardware fingerprint and authorized access information.

* * * * *